US009969474B1

(12) United States Patent
Truax et al.

(10) Patent No.: US 9,969,474 B1
(45) Date of Patent: May 15, 2018

(54) TROLLING MOTOR ASSEMBLIES

(71) Applicant: Brunswick Corporation, Lake Forest, IL (US)

(72) Inventors: Perin Truax, Caledonia, MI (US); Macrae Parks, Grand Rapids, MI (US); Elzie McKinney, Grand Rapids, MI (US); Brian Scott, Comstock Park, MI (US); John Witte, Ada, MI (US)

(73) Assignee: Brunswick Corporation, Mettawa, IL (US)

(*) Notice: Subject to any disclaimer, the term of this patent is extended or adjusted under 35 U.S.C. 154(b) by 0 days. days.

(21) Appl. No.: 15/637,602

(22) Filed: Jun. 29, 2017

Related U.S. Application Data

(60) Provisional application No. 62/372,516, filed on Aug. 9, 2016.

(51) Int. Cl.
| *B63H 21/17* | (2006.01) |
| *B63H 20/00* | (2006.01) |
| *B60L 11/02* | (2006.01) |
| *B63H 20/10* | (2006.01) |

(52) U.S. Cl.
CPC .......... *B63H 20/007* (2013.01); *B60L 11/02* (2013.01); *B63H 20/106* (2013.01); *B63H 21/17* (2013.01); *B63B 2221/24* (2013.01); *B63H 20/00* (2013.01)

(58) Field of Classification Search
CPC .... B63H 20/007; B63H 20/106; B63H 21/17; B60L 11/02
USPC .............................................................. 440/6
See application file for complete search history.

(56) References Cited

U.S. PATENT DOCUMENTS

| 3,604,674 | A | | 9/1971 | Wilkerson | |
| 3,724,790 | A | | 4/1973 | Harris et al. | |
| 3,861,628 | A | * | 1/1975 | Krieger | B63H 20/007 248/642 |
| 3,999,500 | A | * | 12/1976 | Friedel | B63H 20/007 248/642 |
| 4,008,680 | A | | 2/1977 | Alexander, Jr. | |
| 4,154,417 | A | | 5/1979 | Foley, Jr. | |

(Continued)

OTHER PUBLICATIONS

Minnkota Motors, "Powerdrive V2", website, last accessed Jul. 21, 2016, available at http://www.minnkotamotors.com/TrollingMotors/FreshwaterBowMount/PowerDriveV2/.

(Continued)

*Primary Examiner* — Stephen P Avila
(74) *Attorney, Agent, or Firm* — Andrus Intellectual Property Law, LLP

(57) ABSTRACT

A trolling motor assembly includes a base and an attached cradle. A transmission housing is coupled to the base by a pivot pin defining an axis about which the transmission housing pivots. A shaft is supported by the transmission housing and moves relative to the transmission housing in a direction which is parallel to a central axis of the shaft. The shaft is also rotatable with respect to the transmission housing about the central axis. A thrust motor is attached to and moves and rotates with the shaft. The assembly is movable from a deployed position, in which the shaft central axis is aligned vertically, the transmission housing is locked in an upright position, and the thrust motor is below water, to a stowed position, in which the shaft central axis is aligned horizontally, the transmission housing is pivoted onto its side, and the thrust motor rests in the cradle.

24 Claims, 11 Drawing Sheets

(56) References Cited

U.S. PATENT DOCUMENTS

| | | |
|---|---|---|
| 4,410,161 A | 10/1983 | Booty |
| 4,634,390 A | 1/1987 | Baird |
| 4,708,670 A | 11/1987 | Peters |
| 4,733,848 A | 3/1988 | Slattery |
| 4,911,398 A | 3/1990 | Dilulio et al. |
| 4,966,566 A | 10/1990 | Baird |
| 5,112,256 A | 5/1992 | Clement |
| 5,112,258 A | 5/1992 | Folsom |
| 5,129,845 A | 7/1992 | Henderson |
| 5,171,173 A | 12/1992 | Henderson et al. |
| 5,509,835 A | 4/1996 | Henderson et al. |
| 5,582,526 A | 12/1996 | Cook, III |
| 5,632,657 A | 5/1997 | Henderson |
| 5,639,272 A | 6/1997 | Henderson et al. |
| 5,884,213 A | 3/1999 | Carlson |
| 5,892,338 A | 4/1999 | Moore et al. |
| 6,325,685 B1 | 12/2001 | Knight et al. |
| 6,352,456 B1 | 3/2002 | Jaszewski et al. |
| 6,394,408 B1 | 5/2002 | Henderson et al. |
| 7,108,096 B1 | 9/2006 | Oxley et al. |
| 7,163,427 B1 | 1/2007 | Lee |
| 7,285,029 B1 | 10/2007 | Janitz |
| 7,294,029 B1 * | 11/2007 | Spaulding ............ B63H 20/007 440/53 |
| 7,399,211 B1 | 7/2008 | Spaulding |
| 7,510,450 B1 | 3/2009 | Dresher |
| 8,257,122 B1 | 9/2012 | Holley |
| 8,439,715 B1 | 5/2013 | Clark |
| 8,814,129 B2 | 8/2014 | Todd et al. |
| 8,991,280 B2 | 3/2015 | Wireman |
| 9,160,210 B2 | 10/2015 | Perry |
| 9,278,745 B2 | 3/2016 | Kooi, Jr. et al. |
| 2003/0024456 A1 | 2/2003 | Swetish |
| 2007/0232159 A1 | 10/2007 | Lee |
| 2008/0215238 A1 | 9/2008 | Geelen et al. |
| 2015/0298782 A1 * | 10/2015 | Bernloehr ............ B63H 5/125 440/6 |

OTHER PUBLICATIONS

Haibo Motor, "Parts Show Room", website, last accessed Aug. 1, 2016, available at http://www.haibomotor.com/english/peijian.php.

* cited by examiner

TROLLING MOTOR ASSEMBLIES

CROSS-REFERENCE TO RELATED APPLICATION

The present application claims the benefit of and priority to U.S. Provisional Application Ser. No. 62/372,516, filed on Aug. 9, 2016, which is hereby incorporated herein by reference.

FIELD

The present disclosure relates to trolling motor assemblies for propelling boats in bodies of water. The present disclosure also relates to methods for controlling operation of trolling motors on boats.

BACKGROUND

The following U.S. patents are incorporated by reference herein.

U.S. Pat. No. 7,294,029 discloses a mount apparatus for a trolling motor having latching positions for the stowed and deployed conditions of the trolling motor. Locking the mechanism in either the stowed or deployed positions is accomplished solely by moving the shaft of the trolling motor assembly in a lever-like movement about a pivot axis which extends through the base and transmission structure of the mount apparatus. This locking procedure is accomplished without the necessity of moving the shaft in a direction which is generally parallel to its central axis. As a result, the locking movement required by an operator to latch the trolling motor in its deployed and stowed positions is ergonomically preferable to known types of systems.

U.S. Pat. No. 8,991,280 discloses a steering apparatus having variable steering ratios. An apparatus disclosed therein includes a steering drum to rotate about a longitudinal axis in a first direction and a second direction different than the first direction. The steering drum has a shape to provide a varying steering ratio when the steering drum is rotated.

U.S. Pat. No. 9,160,210 discloses rotary encoders for use with trolling motors. An example rotary encoder includes a housing defining an aperture and a linear guide and an input sleeve to extend through the aperture. The input sleeve includes an exterior guide to be engaged and followed by a shuttle to enable rotary position information to be obtained from the input sleeve. The shuttle is movably coupled within the linear guide. The shuttle is biased to engage a central portion of the exterior guide if rotation of the input sleeve moves the shuttle past first or second ends of the groove to prevent the rotary encoder from being damaged by over-rotation of the input sleeve.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A trolling motor assembly for propelling a boat in a body of water includes a base configured to be attached to the boat. A cradle is attached to the base and has an upper end with an upwardly concave surface. A transmission housing is coupled to the base by way of a pivot pin extending generally transverse to the base and defining a pivot axis about which the transmission housing is pivotable with respect to the base. A shaft is supported by the transmission housing and is moveable relative to the transmission housing in a direction which is generally parallel to a longitudinal central axis of the shaft. The shaft is also rotatable with respect to the transmission housing about the shaft central axis. A thrust motor is attached to a lower end of the shaft and is moveable and rotatable with the shaft. The assembly is movable from a deployed position, in which the shaft central axis is aligned generally vertically, the transmission housing is locked in an upright position with respect to the base, and the thrust motor is configured to be below water, to a stowed position, in which the shaft central axis is aligned generally horizontally, the transmission housing is pivoted onto a first side thereof within the base, and the thrust motor rests in the upwardly concave surface of the cradle.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed. Each of the examples of systems provided in the figures and in the following description can be implemented separately, or in conjunction with one another and/or with other systems.

Figure 1:
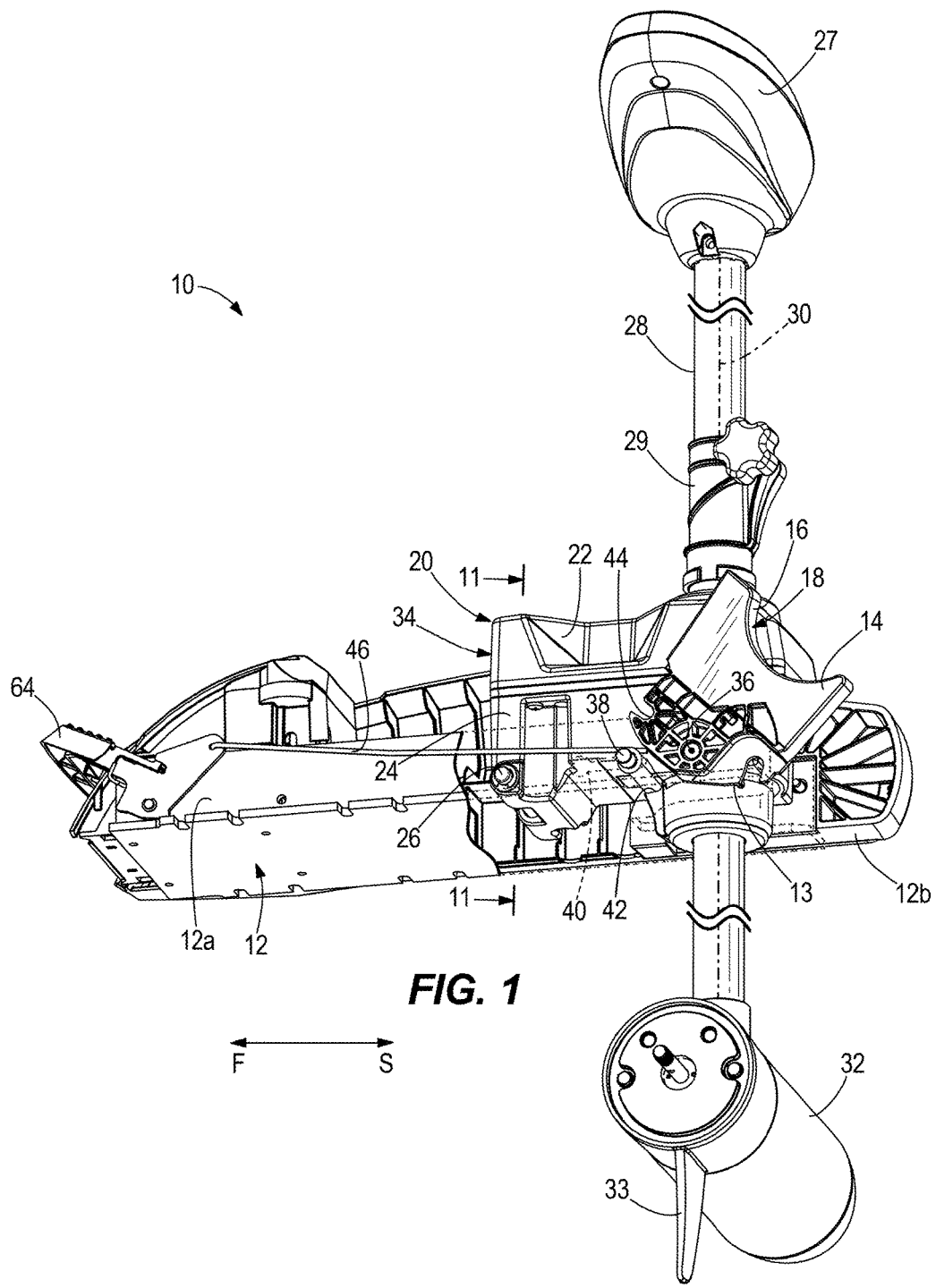
FIG. 1 illustrates a first embodiment of a trolling motor assembly, including a rotatable cradle, in which the trolling motor assembly is in a deployed position.

FIG. 1 illustrates a trolling motor assembly 10 for propelling a boat in a body of water. The assembly 10 includes a base 12 configured to be attached to the boat, such as at the bow or stern of the boat. A cradle 14 is attached to the base 12. The cradle 14 has an upper end 16 that forms an upwardly concave surface 18. A transmission housing 20, including an upper housing portion 22 and a lower housing portion 24, is coupled to the base 12 by way of a transmission housing pivot pin 26 extending generally transverse to the base 12. The transmission housing 20 is pivotable with respect to the base 12 about a pivot axis, which is defined by and coaxial with the transmission housing pivot pin 26. The transmission housing 20 holds transmission components, such as a steering motor 108 and gear train 109, as will be described further herein below with respect to FIG. 11. The steering motor 108 is coupled to a steering shaft 28 via the gear train 109, and thereby rotates the shaft 28 in response to steering commands from an operator input device such as a foot pedal, remote control, or similar device or from an auto-pilot type controller. The shaft 28 is supported by the transmission housing 20 and is moveable relative to the transmission housing 20 in a direction which is generally parallel to a longitudinal central axis 30 of the shaft 28. Such movement is facilitated in part by unclamping a depth collar 29 provided around the shaft 28 just above the transmission housing 20, which when clamped holds the shaft 28 at a selected position along its central axis 30 with respect to the transmission housing 20. The shaft 28 is also rotatable with respect to the transmission housing 20 about the shaft central axis 30, as will be described further herein below with respect to FIG. 11.

Note that the below examples will be described with respect to parts moving in a first direction and a second direction or being on first, second, third, etc. sides of the trolling motor assembly 10, so as to indicate that the trolling motor assembly 10 can be mounted to the bow, stern, or elsewhere on the boat. Where any reference to "fore" or "aft" is made herein, for purposes of such description, the trolling motor assembly 10 is assumed to be attached to the boat at its stern. The opposite description would then apply were the trolling motor assembly 10 to be attached to the boat's bow.

A head 27 of the trolling motor assembly 10 is attached to an upper end of the shaft 28. The head 27 may contain a global positioning system (GPS) unit that determines a global position of the assembly 10. The global position can be communicated to a controller, including a processor and a memory, for interpreting commands from a remote control, foot pedal, or GPS-enabled mapping device, processing those commands, and thereafter sending signals to the steering motor 108 to rotate the shaft 28 according to such commands. In one example, the controller is located in the transmission housing 20. A thrust motor 32 is attached to the shaft 28, at a lower end of the shaft 28 that is configured to be deployed under water. The thrust motor 32 is movable and rotatable with the shaft 28 along and about the shaft central axis 30. The thrust motor 32 is attached to a propeller 33 that spins under power of the thrust motor 32 to provide a thrust to propel the boat. The thrust motor 32 can rotate the propeller 33 in both a clockwise and a counterclockwise direction to enable forward and reverse movement of the boat.

The assembly 10 is moveable from a deployed position to a stowed position, which positions will be described with respect to FIGS. 1 and 3. In the deployed position, shown in FIG. 1, the shaft central axis 30 is aligned generally vertically, the transmission housing 20 is locked in an upright position with respect to the base 12, and the thrust motor (not shown) is configured to be below water. In the stowed position, shown in FIG. 3, the shaft central axis 30 is aligned generally horizontally, the transmission housing 20 is pivoted onto a first side 34 thereof within the base 12, and the thrust motor 32 rests in the upwardly concave surface 18 of the cradle 14. In one example, the first side 34 of the transmission housing 20 is its fore side, and the transmission housing 20 is rotated in toward the boat. In the first embodiment of the assembly 10, shown in FIGS. 1-4, the cradle 14 is rotatable with respect to the base 12 about a cradle pivot axis 36 that extends generally transverse to the base 12. The cradle pivot axis 36 may be defined by a pivot pin or shaft, and rotation about the cradle pivot axis 36 enables the assembly 10 to move from the deployed position to the stowed position and vice versa.

Figure 2:
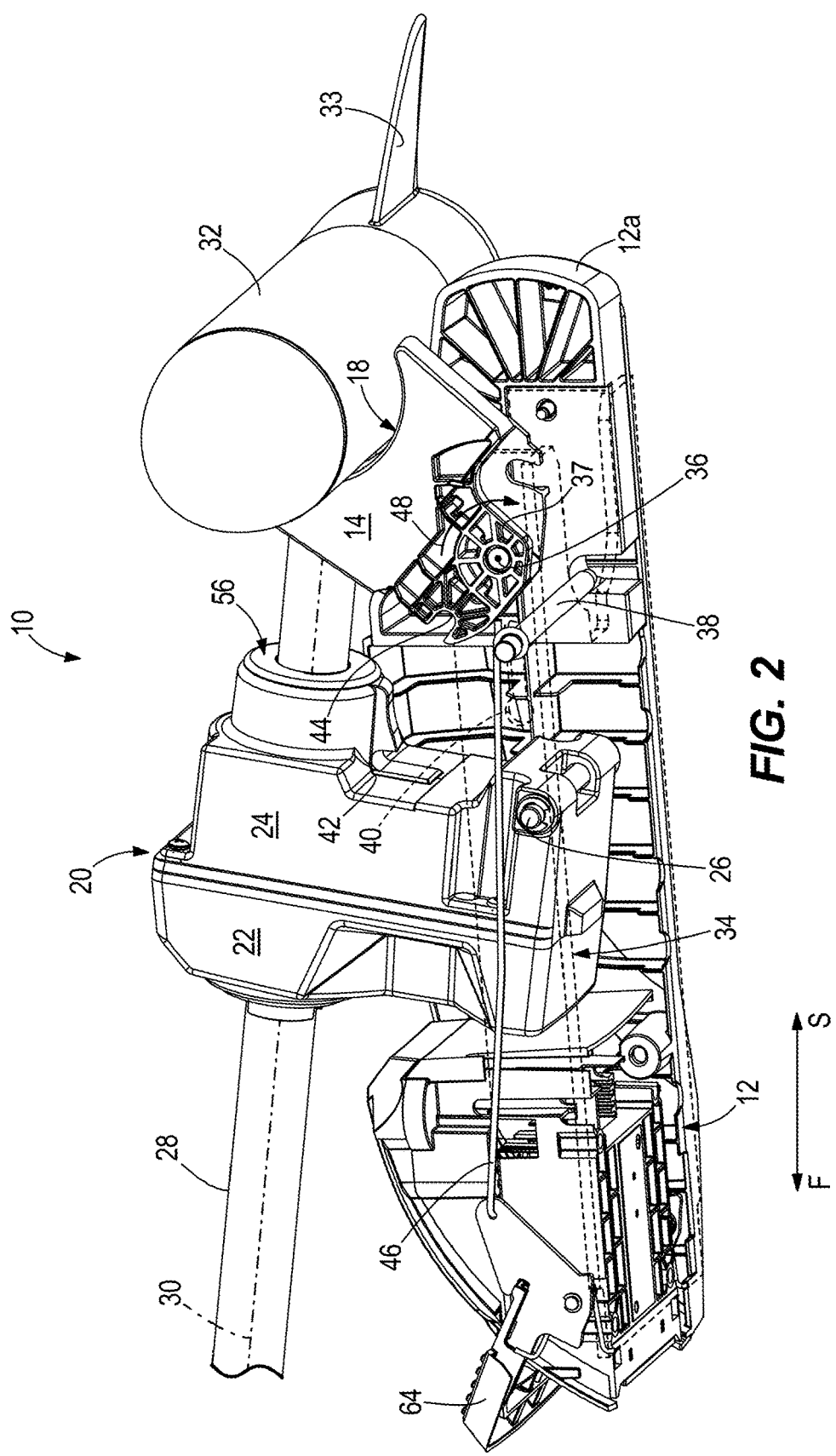
FIG. 2 illustrates the first embodiment of the trolling motor assembly in a different position.
Figure 3:
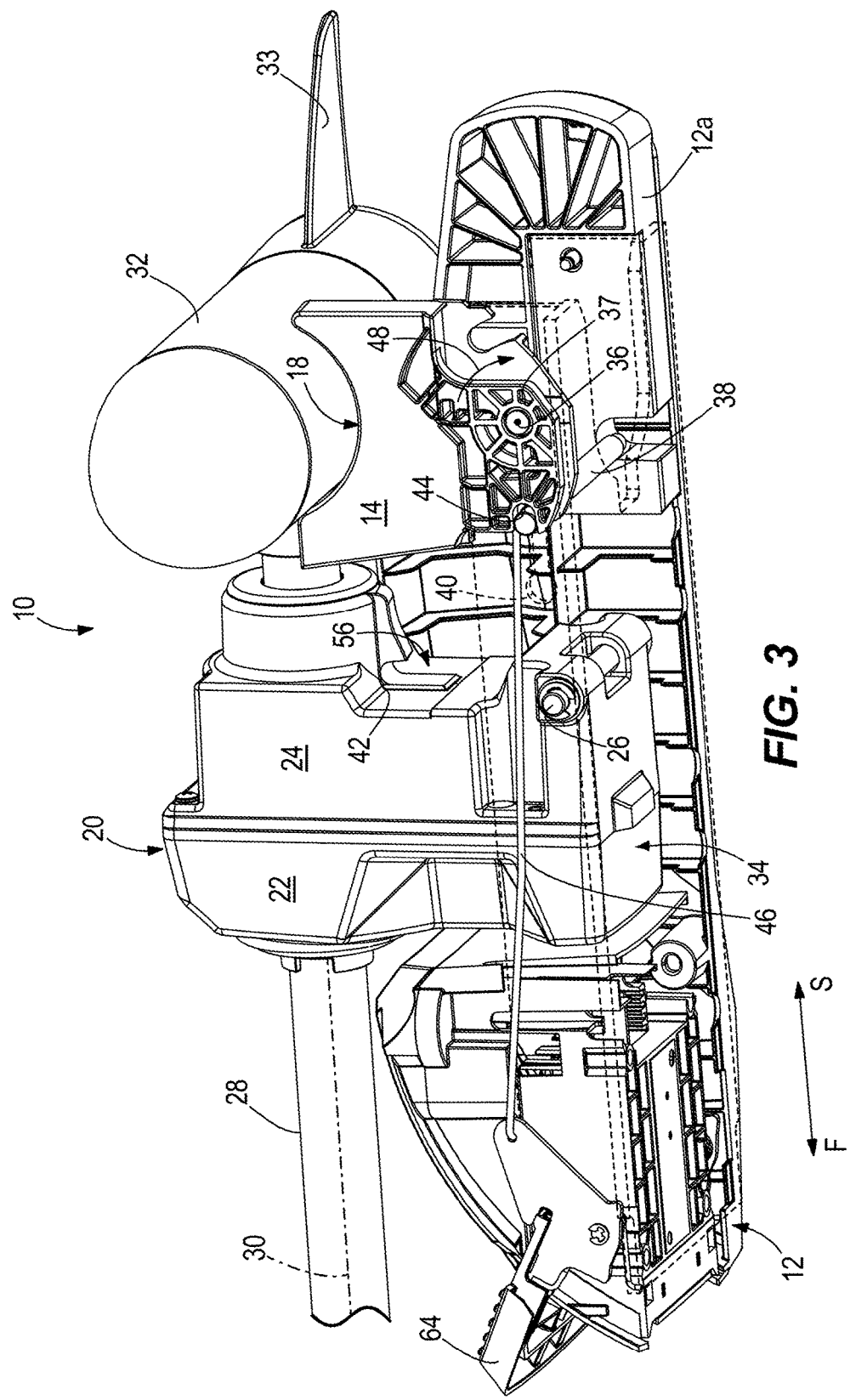
FIG. 3 illustrates the first embodiment of the trolling motor assembly in a stowed position and the location of a spring that biases the cradle with respect to a base of the assembly.

As shown by the progression in FIGS. 1-3, the cradle 14 pivots in a counterclockwise direction about the cradle pivot axis 36 such that it moves from an angled position (FIG. 1) to an upright position (FIG. 3). Such pivoting occurs in response to the thrust motor 32 contacting the upper end 16 of the cradle 14 as the shaft 28 is pulled in the first direction "F", which tends to pivot the cradle 14 in the counterclockwise direction and into its upright position. The assembly 10 further includes a locking pin 38 coupled to the base 12. As shown herein, the locking pin 38 extends generally transverse to the base 12, which may comprise two laterally spaced arms 12a, 12b. The locking pin 38 travels in the first direction F and in a second direction "S" in a horizontal slot 40 in arm 12a of the base 12. The locking pin 38 locks the transmission housing 20 in the upright position when the assembly 10 is in the deployed position. This is shown in FIG. 1, in which the locking pin 38 is in a locking slot 42 of the transmission housing 20. The locking pin 38 can also lock the cradle 14 in an upright position when the assembly 10 is in the stowed position as shown in FIG. 3, in which the locking pin 38 is in a locking slot 44 of the cradle 14.

The locking pin 38 can be moved within the horizontal slot 40 by way of a release mechanism 46 that is coupled to the locking pin 38. In one example, the release mechanism 46 is a wire coupled to a foot pedal 64 or handle which actuates the release mechanism 46 in the first and second directions F, S. Movement of the release mechanism 46 in the first direction F moves the locking pin in the first direction in the horizontal slot 40 and out of engagement with the locking slot 42 in the transmission housing 20, thereby enabling the assembly 10 to be pivoted from the deployed position toward the stowed position, as shown in FIG. 2. Once the assembly 10 has fully reached the stowed position, movement of the release mechanism 46 in the second direction S moves the locking pin 38 in the second direction in the horizontal slot 40 and into engagement with the locking slot 44 in the cradle 14, thereby locking the cradle 14 in its upright position, as shown in FIG. 3. The reverse is also true, such that movement of the release mechanism 46 in the first direction F moves the locking pin 38 in the first direction in the horizontal slot 40 and out of engagement with the locking slot 44 in the cradle 14, thereby allowing the assembly 10 to be moved back to the deployed position, where movement of the release mechanism 46 in the second direction S will move the locking pin 38 in the second direction in the horizontal slot 40 back into engagement with the locking slot 42 in the transmission housing 20, locking the transmission housing 20 in its upright position.

In other examples, as described with respect to FIGS. 5-7, the release mechanism 46 and the locking pin 38 may both be incorporated into a single component, referred to later as a latching rod. In that instance, the latching rod would serve as the release mechanism, the locking pin, and the lock for the rotating cradle 14. The latching rod would also serve as the stowed position lock for the transmission housing 20 and as the return spring for a foot pedal 64 or other actuator for stowing and deploying the assembly 10.

Referring further to FIG. 2, the assembly 10 may also include a spring 37 in contact with both the cradle 14 and the base 12. In one example, the spring 37 is located laterally between the cradle 14 and the base 12. Note that the spring 37 is designed such that it biases the cradle 14 around the cradle pivot axis 36 with respect to the base 12, such that the assembly 10 is biased into the deployed position. In other words, the spring 37 adds force to push the thrust motor 32 into the water as the assembly 10 is being deployed. This is shown by the direction of the arrow 48, which indicates a spring force on the cradle 14 in a clockwise direction. Thus, the cradle 14 is a spring-loaded rotating cradle that holds the thrust motor 32 in the stowed position and assists with moving the thrust motor 32 into the deployed position. The spring 37 may be a torsion spring, a leaf spring, a clock spring, or other type of spring that is located on the inside or the outside face of the cradle 14. For example, the spring 37 can be a torsion spring wound around the cradle pivot axis 36 and located between the base 12 and the cradle 14.

Figure 4:
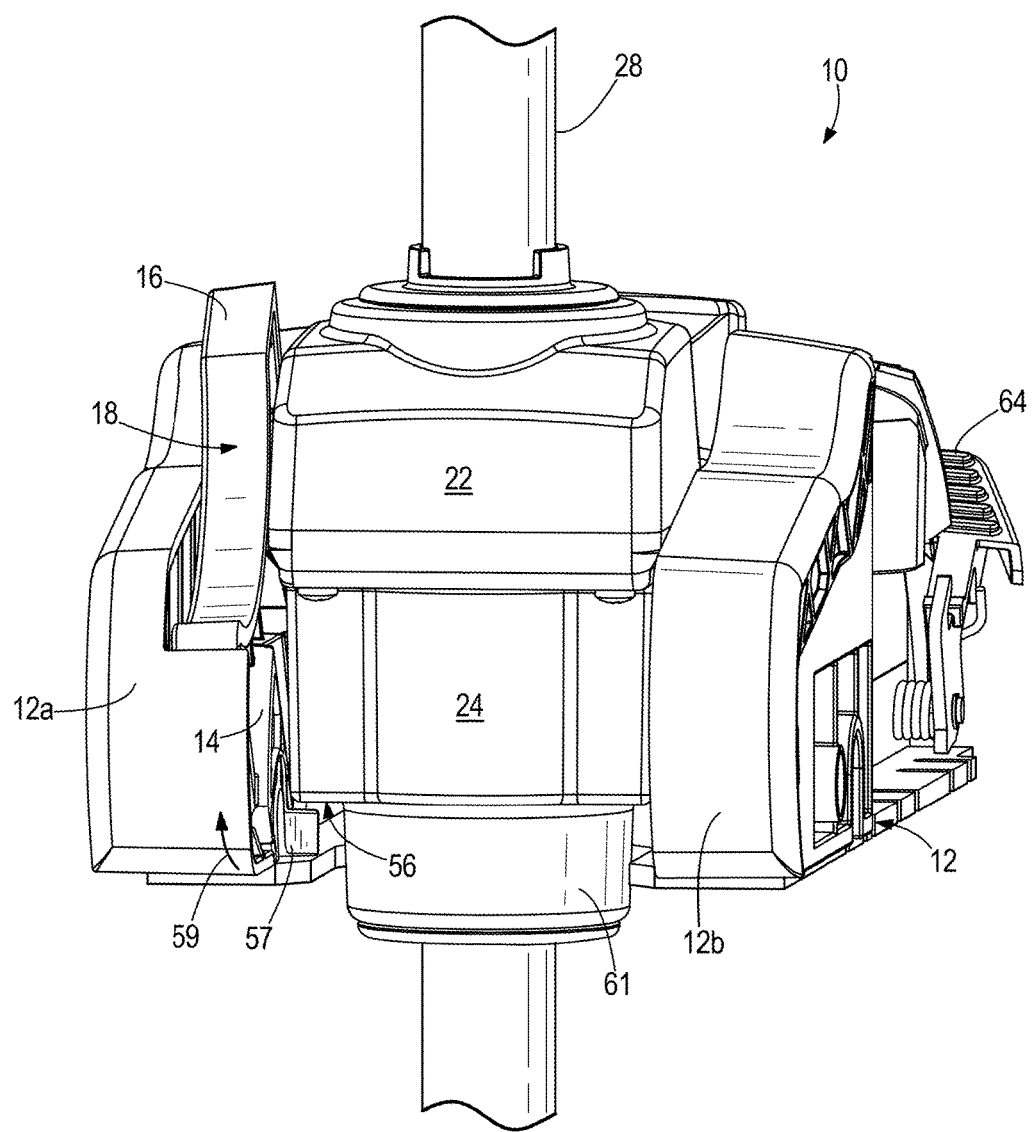
FIG. 4 illustrates a rear perspective view of the first embodiment of the trolling motor assembly and the location of a tab that prevents the cradle from rotating while a transmission housing of the assembly is in an upright position.

FIG. 4 illustrates a rear perspective view of the assembly 10 when it is in the deployed position, with the transmission housing 20 in the upright position. Note that the cradle 14 is not in the upright position, but is rather in the angled position of FIG. 1. Also note that the cradle 14 only has one arm in this example, but could have two arms instead, one near each side of the base 12. The transmission housing 20 has a second side 56 (here, the bottom side) through which the shaft 28 extends. Just below the second side 56 of the transmission housing 20, a tab 57 can be seen protruding from an inner face of the cradle 14. The tab 57 is coupled to a lower end 13 of the cradle 14 (see FIG. 1) and extends inwardly under the second side 56 of the transmission housing 20 when the transmission housing 20 is locked in the upright position. The tab 57 prevents the cradle 14 from rotating with respect to the base 12 when the assembly 10 is in the deployed position. For example, if a force were to be applied to the cradle 14 tending to rotate it in the direction of arrow 59, a top surface of the tab 57 would hit the second side of the transmission housing 20. Such contact would prevent further rotation of the cradle 14 into its upright position. The cradle 14 therefore will remain in its angled position until the shaft 28 and transmission housing 20 are pulled into the position shown in FIG. 2, where the thrust motor 32 will contact the waiting cradle 14 and rotate it into the upright position. The tab 57 no longer prevents such rotation of the cradle 14 because the transmission housing 20 has been moved away from the cradle 14, upwardly along the shaft 28.

Figure 5:
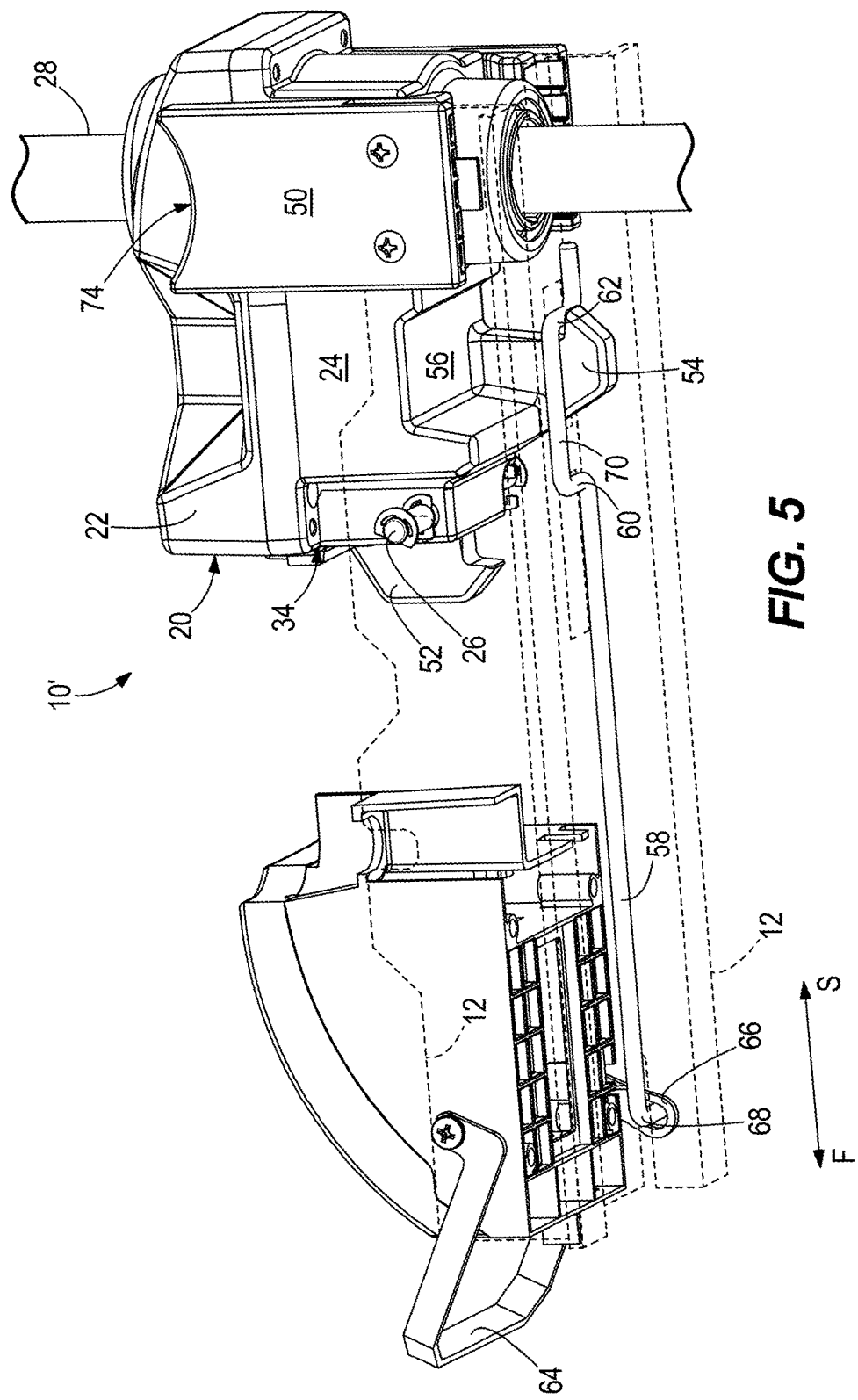
FIG. 5 illustrates a second embodiment of a trolling motor assembly, with the assembly in a deployed position.
Figure 6:
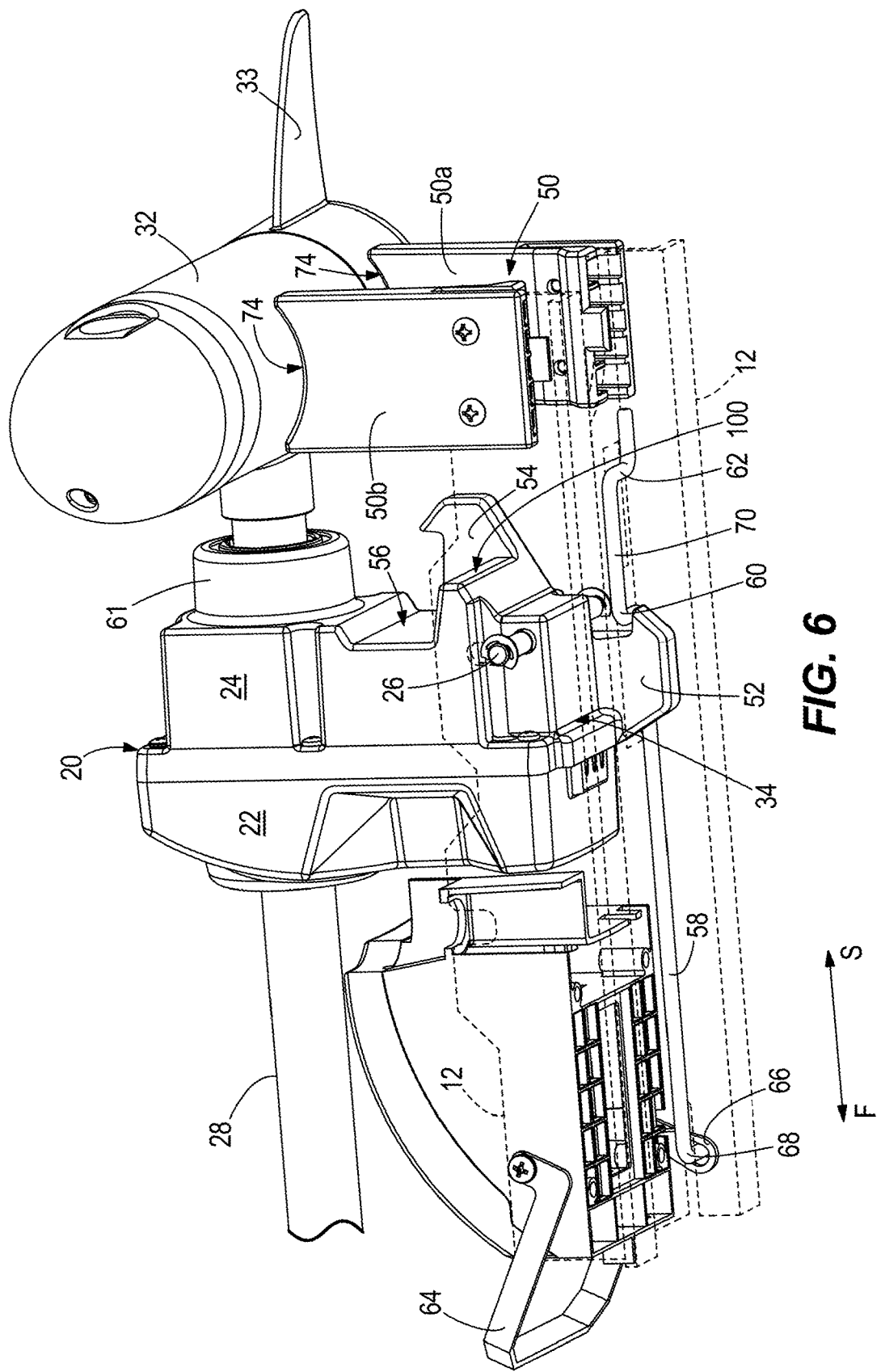
FIG. 6 illustrates the second embodiment of the trolling motor assembly, with the assembly in a stowed position.
Figure 7:
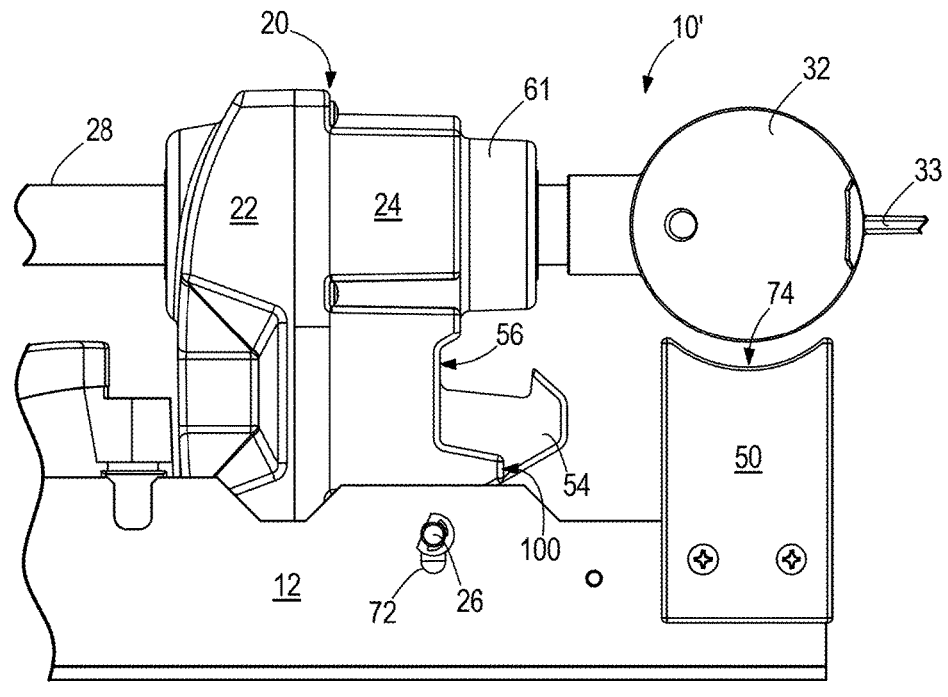
FIG. 7 illustrates a detailed view of the second embodiment of the assembly, with a thrust motor hovering above the cradle.

FIGS. 5-7 show a second embodiment of a trolling motor assembly 10', aspects of which that are similar to those of the first embodiment of the assembly 10 will not be described further herein. In the embodiment of FIGS. 5-7, the cradle 50 is a stationary cradle that does not rotate with respect to the base 12. Note, as mentioned briefly herein above, the base 12 comprises two arms that are laterally spaced from one another. Similarly, the cradle 50 comprises two arms 50a, 50b that are laterally spaced from one another and coupled to either of the laterally spaced arms of the base 12.

Figure 10:
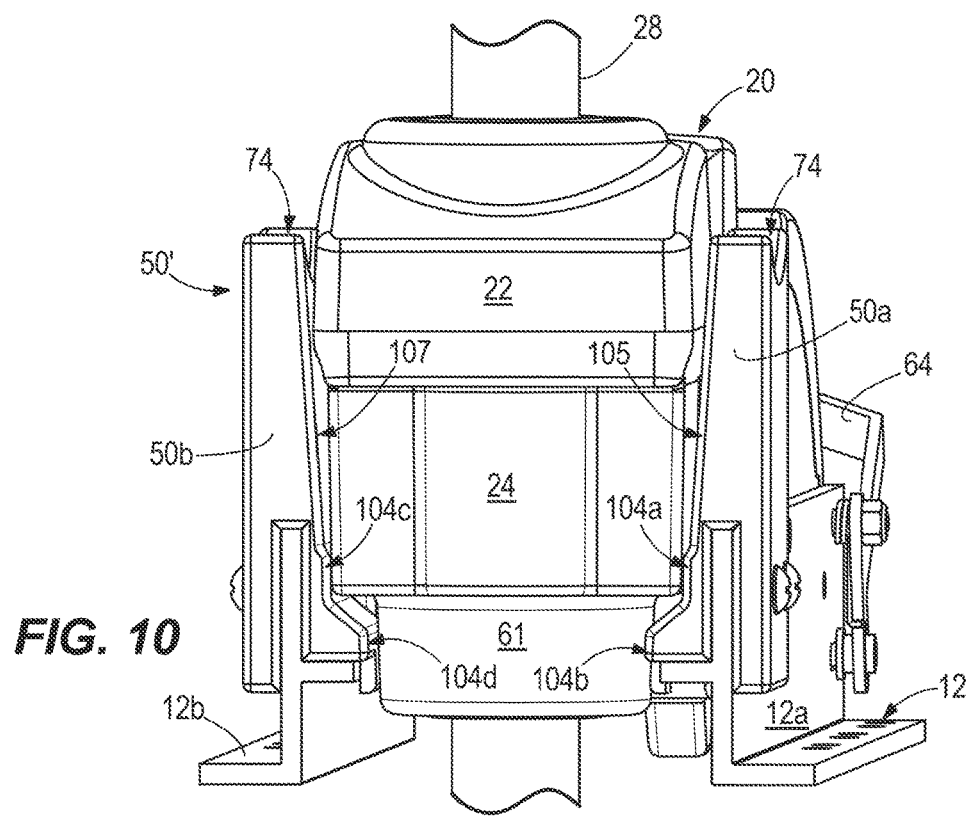
FIG. 10 illustrates an embodiment of a cradle of a trolling motor assembly.

(See FIG. 10.) The transmission housing 20 is shown in the upright position, and the assembly 10' is thus shown in the deployed position in FIG. 5, while the assembly 10' is shown in the stowed position in FIG. 6.

The assembly 10' includes a first hook 52 on the first side 34 of the transmission housing 20. The assembly 10' also includes a second hook 54 on a second side 56 (here, the bottom side) of the transmission housing 20. A latching rod 58 is coupled to the base 12 and horizontally moveable in the first direction F and the second direction S, similar to the release mechanism 46 described herein above. The latching rod 58 engages with the first hook 52 to hold the transmission housing 20 on its first side 34 while the assembly 10' is in the stowed position. This is shown in FIG. 6, in which a first bend 60 in the latching rod 58 is engages with the first hook 52. The latching rod 58 also engages with the second hook 54 to hold the transmission housing 20 on its second side 56 and to lock the transmission housing 20 in its upright position while the assembly 10' is in the deployed position, as shown in FIG. 5. Here, the latching rod 58 is shown with a second bend 62 engaged with the second hook 54. Actuation of the latching rod 58 can be accomplished by way of a foot pedal 64 or other handle. For example, as shown in FIG. 6, movement of the foot pedal 64 in a downward or counterclockwise direction will push on a lever arm 66 and cause the lever arm 66 to rotate in the counterclockwise direction, thereby pushing the latching rod 58 in the second direction S at pivot point 68. This will move the entire bent portion 70 of latching rod 58 in the second direction S, thereby disengaging first bend 60 from first hook 52 and allowing the assembly 10' to be rotated into the deployed position. (During such rotation, the transmission housing 20 rotates about a fulcrum 100, driving the transmission housing pivot pin 26 to the top of a vertical slot 72, as will be described herein below with respect to FIGS. 7 and 9.) Releasing the foot pedal 64 will cause the latching rod 58 to move in the first direction F, thereby engaging second bend 62 with second hook 54 and locking the transmission housing 20 in the upright position, as shown in FIG. 5.

To return the assembly 10' to the stowed position, pushing the foot pedal 64 downwardly will again push the latching rod 58 in the second direction S, thereby disengaging the second bend 62 from the second hook 54. Once the assembly 10' is in the stowed position, releasing the foot pedal 64 will pull the latching rod 58 in the first direction F, engage the first bend 60 with the first hook 52, and lock the transmission housing 20 on its first side 34. Note that if a latching rod serves as both the release mechanism 46 and the locking pin 38 in the embodiment of FIGS. 1-4, the transmission housing 20 in the first embodiment of the trolling motor assembly 10 may also include a hook on the first side 34 of the transmission housing 20, similar to the first hook 52 described herein. The latching rod in the first embodiment could be designed the same as the latching rod 58 described with respect to the second embodiment, and the latching rod would engage the hook and hold the transmission housing 20 on the first side 34 while the assembly 10 was in the stowed position. Note also that each of the above-described movements for locking and unlocking the transmission housing 20 via the hooks 52, 54 and latching rod 58 could be reversed in the event that the hooks 52 and 54 were curved in the opposite direction of that shown herein, which would require only minimal changes to the connections between the foot pedal 64, the lever arm 66, and the latching rod 58.

FIG. 7 illustrates a vertical slot 72 in the base 12 through which the transmission housing pivot pin 26 extends. In fact, aligned vertical slots 72 exist in both opposing arms of the base 12, the transmission housing pivot pin 26 extends through the transmission housing 20, and each opposing end of the transmission housing pivot pin 26 extends into a respective vertical slot 72. Movement of the transmission housing pivot pin 26 in an upward direction in the vertical slot 72 enables the thrust motor 32 to clear the stationary cradle 50 while the assembly 10' is moving between the stowed and deployed positions, as shown in FIG. 7. By sliding the transmission housing pivot pin 26 upwards in the vertical slot 72, the transmission housing 20 lifts, the thrust motor 32 lifts, and the thrust motor 32 can travel over the stationary cradle 50 without damage to either part. In contrast, movement of the transmission housing pivot pin 26 in a downward direction in the vertical slot 72 enables the thrust motor 32 to rest in the upwardly concave surface 74 of the cradle 50, as shown in FIG. 6. Movement of the transmission housing pivot pin 26 in the downward direction in the vertical slot 72 also brings the first hook 52 down to the plane of the latching rod 58. By sliding the transmission housing pivot pin 26 downwards in the vertical slot 72, the first hook 52 on the transmission housing 20 therefore is able to engage with the latching rod 58.

Now turning to FIG. 8, a third embodiment of the trolling motor assembly 10" will be described. This embodiment provides an alternative to the vertical slot 72 in which the transmission housing pivot pin 26 travels in order to allow the thrust motor 32 to clear the stationary cradle 50. The cradle 76 in the third embodiment is a stationary cradle that comprises a convexly rounded surface 78 on a side of the assembly 10" opposite the foot pedal 64. The convexly rounded surface 78 includes a living hinge 80 that connects to the upwardly concave surface 84 of the cradle 76 in which the thrust motor 32 is to rest. The living hinge 80 enables the cradle 76 to flex as the thrust motor 32 moves over the cradle 76 when the assembly 10" moves between the stowed and deployed positions. Note that the cradle 76 in fact comprises two arms, both of which have the convexly rounded surface 78 and both of which comprise a living hinge 80. In this example, the living hinges 80 are formed by crescent shaped cutouts 82 molded into the cradle 76 during manufacturing. The living hinges 80 bend as the thrust motor 32 passes over them as the assembly 10" is moving between the stowed and deployed positions, and the living hinges 80 springs back to their rest positions once the force from the thrust motor 32 is removed. Such bending and return spring force is provided by way of the crescent shaped cutouts 82 becoming narrower as force is applied and then wider once again as force is released. The upwardly concave surface 84 of the cradle 76 may include concave locking surfaces 86 that move with the living hinges 80 and that hold the thrust motor 32 in place when the assembly 10" is in the stowed position. The locking surfaces 86 may be integral with the upwardly concave surface 84, and may provide locking force by the natural spring force of the living hinges 80, which natural spring force tends to push against the thrust motor 32.

Figure 8:
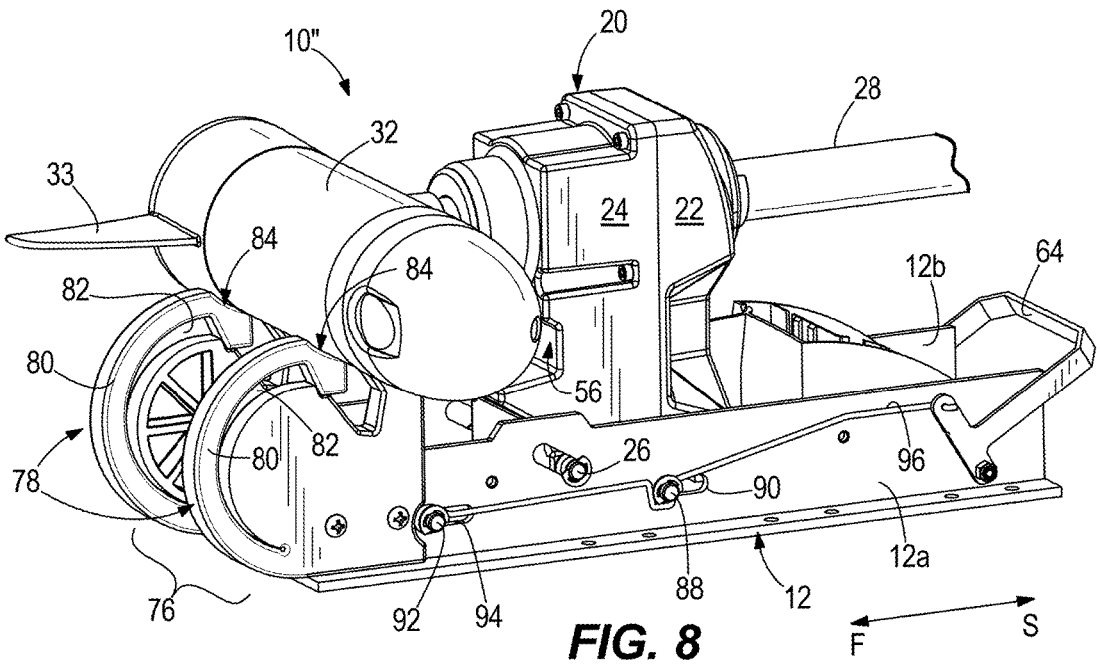
FIG. 8 illustrates a third embodiment of a trolling motor assembly, with the assembly in a stowed position.

Note that the assembly 10" of FIG. 8 could include the latching rod 58 and hook 52, 54 configuration of the second embodiment of the assembly 10'. However, in the third embodiment shown herein, the assembly 10" includes a double pin configuration, in which a first hook (for example, similar to first hook 52, FIG. 6) on the first side 34 of the transmission housing 20 engages with a first pin 88 located in a first slot 90 in the base 12 in order to hold the transmission housing 20 on its first side 34 while the assembly 10" is in the stowed position. Note that the first pin 88 that locks the transmission housing 20 on its first side 34 is located in the base 12, which makes the assembly easier to manufacture than an arrangement in which the pin extends through the transmission housing 20 itself. A second hook (for example, similar to second hook 54, FIG. 6) on the second side 56 of the transmission housing 20 engages with a second pin 92 located in a second slot 94 in the base 12, which holds the transmission housing 20 on its second side 56 and locks the transmission housing 20 in its upright position while the assembly 10" is in the deployed position. The first and second pins 88, 92 may be coupled to a release mechanism 96, similar to that described with respect to the first embodiment, which release mechanism 96 is coupled to a foot pedal 64.

The first pin 88 holds the transmission housing 20 on its first side 34 and thus holds the shaft 28 generally horizontally while the assembly 10" is transitioning between being stowed and deployed. This means the shaft 28 may be kept horizontal while it is slid through the transmission housing 20, thereby making stowing and deployment easier for the operator. When the assembly 10" is in the stowed position, downward force on the foot pedal 64 will pull on the release mechanism 96, causing the first pin 88 to come unlocked from the hook on the first side 34 of the transmission housing 20. (Note that this shows an alternative lever arrangement to that of the second embodiment described herein above.) The transmission housing 20 can thereafter rotate down into the deployed position, and may even do so automatically if it is biased by a spring as described with respect to the first embodiment. Note that the first hook on the first side 34 of the transmission housing 20 may be similar to the first hook 52 described with respect to the second embodiment of the assembly 10'. Note that the second hook on the second side 56 of the transmission housing 20 could be similar to the locking slot 42 described with respect to the first embodiment of the assembly 10, or similar to the second hook 54 described with respect to the second embodiment of the assembly 10'.

Now turning to FIG. 9, a particular embodiment of the transmission housing 20' will be described. In this example, the transmission housing 20' includes a locking surface 98 that extends across a lower edge (here, the fore edge) of the transmission housing 20' proximate the first side 34. The locking surface 98 is located adjacent and parallel to the transmission housing pivot pin 26. The locking surface 98 contacts the upper surface 101 of each of the arms of the base 12. The locking surface 98 has a radius that is off center with respect to the transmission housing pivot axis 102 (the radius, for example, changes from a minimum of R1 to a maximum of R2) and therefore acts as an eccentric cam with respect to the transmission housing pivot axis 102, which as mentioned hereinabove, is coaxial with the transmission housing pivot pin 26. Because the radius of curvature of the locking surface 98 is not centered on the transmission housing pivot axis 102, the eccentric or logarithmic cam locking geometry of the locking surface 98 becomes more firmly pressed against the base 12 as the transmission housing 20' rotates clockwise into the upright position. Once the transmission housing 20' is in its upright position, the cam is locked between the base 12 and the transmission housing pivot pin 26 due to its orientation in which the radius R2 between the transmission housing pivot pin 26 and the locking surface 98 is the greatest, and the assembly is thereby held firmly in the deployed position. Thus, the geometry of the locking surface 98 pushes all pivots to their free play bias direction, thereby firmly locking the transmission housing 20' upright while in the deployed position of the assembly This ultimately increases the GPS precision of the assembly, as the assembly has less play with respect to the boat. The locking surface 98 may extend across the entire lateral width of the transmission housing 20'. The locking surface 98 can be made of metal or plastic, but should be designed so that it can be rotated back in a counterclockwise direction when force is applied so as to return the assembly to the stowed position.

Figure 9:
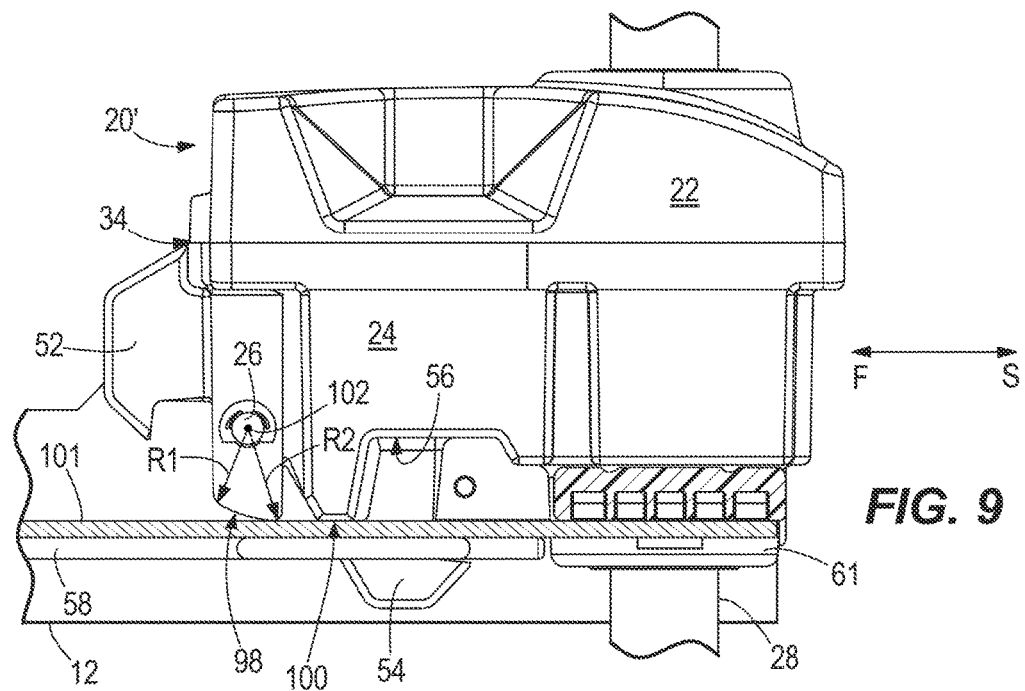
FIG. 9 illustrates an embodiment of a transmission housing of a trolling motor assembly.

FIG. 9 also shows a fulcrum 100 extending across the transmission housing 20' parallel to and offset in the second direction S from the locking surface 98 and the transmission housing pivot axis 102. Pivoting of the transmission housing 20' about the transmission housing pivot axis 102 and about the fulcrum 100, which contacts the upper surface 101 of the base 12 as the assembly moves into the deployed position, causes the transmission housing 20' to translate such that the transmission housing pivot pin 26 slides upward within the vertical slot 72 described herein above with respect to the second embodiment. See FIGS. 6 and 7. Referring back to FIG. 9, as the transmission housing 20' is rotated in a clockwise direction toward its upright/deployed position, the fulcrum 100 acts as a pivot axis and pushes the transmission housing 20' upwards such that the transmission housing pivot pin 26 is pushed upward in the vertical slot 72. This causes the first hook 52 on the first side 34 of the transmission housing 20' to engage the latching rod 58 underneath, as described herein above.

Now turning to FIG. 10, one exemplary embodiment of a cradle 50' will be described. Here the cradle 50' comprises two laterally spaced arms 50a, 50b configured to hold the transmission housing 20 therebetween when the assembly is in the deployed position. Each of the cradle arms 50a, 50b comprises at least one boss, and here each comprises two bosses. For example, cradle arm 50a comprises bosses 104a and 104b, while cradle arm 50b comprises bosses 104c and 104d. The bosses 104a, 104b are formed on an inner face 105 of the cradle arm 50a that opposes the inner face 107 of the cradle arm 50b, which comprises bosses 104c and 104d. The bosses 104a-104d contact the transmission housing 20 on its outer surface and hold the transmission housing 20 firmly in place when the assembly is in the deployed position. The bosses 104a-104d contact the outer surface of the transmission housing 20 where the outer surface of the transmission housing 20 is radially closest to the shaft 28. Here, this is at a lower end of the transmission housing 20 where a cylindrical collar 61 surrounds the shaft 28; however, with a differently shaped transmission housing 20 and/or differently shaped cradle 50', such contact points could be made elsewhere. Note also that contact points in addition to those shown at bosses 104a-104d could be provided. The bosses 104a-104d reduce free play between the transmission housing 20 and the cradle 50', which is attached to the base 12. The bosses 104a-104d are trapped between the transmission housing 20 and the base 12 of the trolling motor assembly and touch both the transmission housing 20 and the rigid base 12, such as if they are integral with the cradle 50'. Rigidity of the transmission housing 20 with respect to the base 12 is helpful for obtaining a precise GPS reading. If a precise GPS reading is not obtainable, holding of the boat at an anchor point or obtaining of a waypoint defined by GPS coordinates will not be as precise.

Note that although the locking surface 98 and the fulcrum 100 on the transmission housing 20' and the bosses 104a-104d on the cradle 50' are shown and described with respect to the second embodiment of the assembly 10' shown in FIGS. 5-7, one or all of these concepts could also be incorporated into the designs of the first embodiment of the assembly 10 shown in FIGS. 1-4 or the third embodiment of the assembly 10" shown in FIG. 8.

Figure 11:
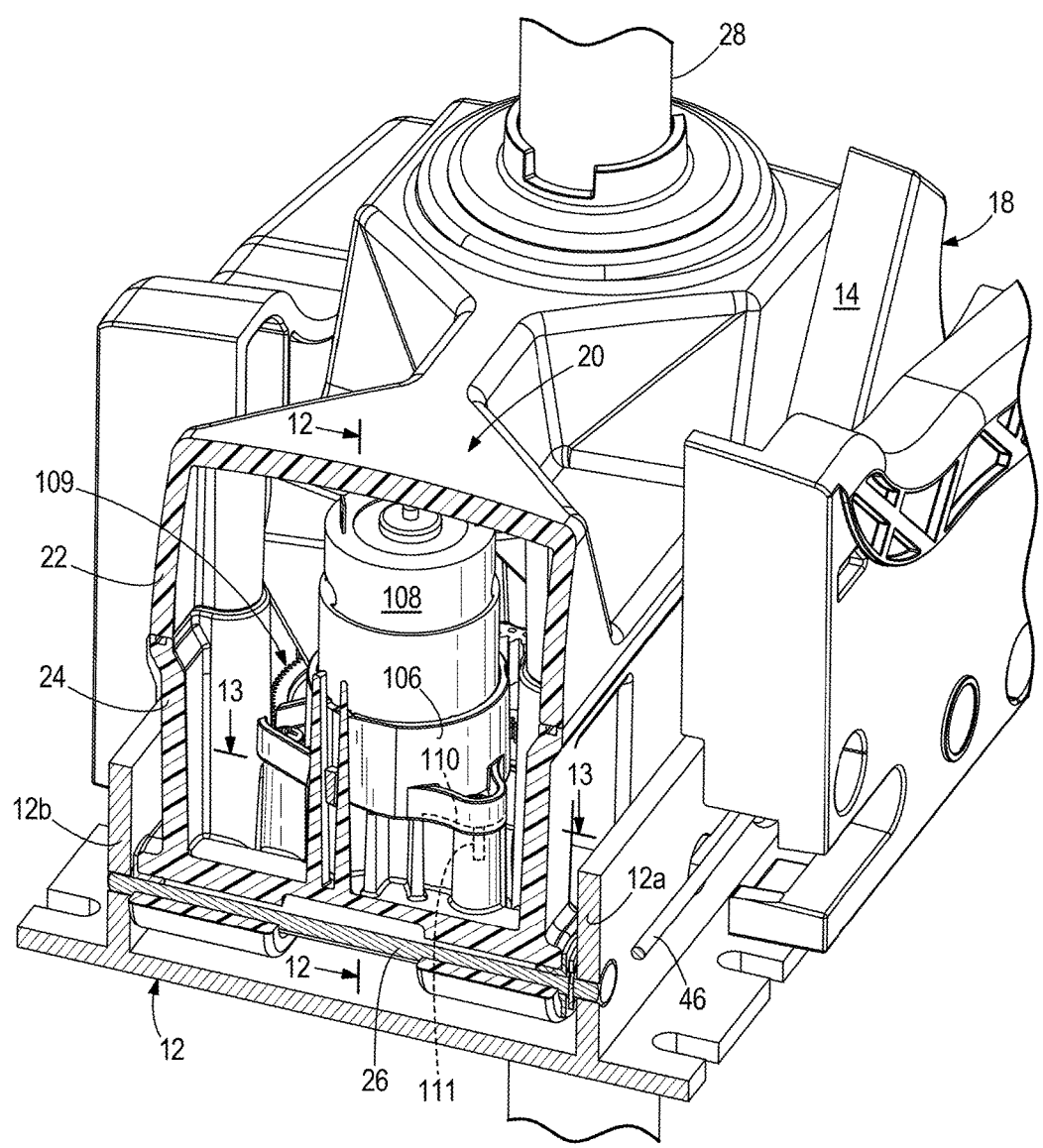
FIG. 11 illustrates an embodiment of a steering motor cup within a transmission housing of a trolling motor assembly.

Turning to FIG. 11, the transmission housing 20 may house a steering motor cup 106 therein. The steering motor cup 106 holds a steering motor 108, which rotates the shaft 28 via a number of gears in a gear train 109 in response to commands from the above-mentioned controller, which may be located in the transmission housing 20. More specifically, the steering motor 108 rotates the gear train 109, which is coupled to and rotates the depth collar 29, which is clamped to and rotates the shaft 28. The gear train 109 therefore transmits rotation of the steering motor 108 to rotation of the shaft 28. The steering motor cup 106 includes a tab 110 that extends outwardly therefrom and that interfaces with the transmission housing 20. For example, the tab 110 may be sandwiched between the upper housing portion 22 and the lower housing portion 24 of the transmission housing 20. Because features of the steering motor cup 106, such as the tab 110, are captured between the upper and lower housing portions 22, 24, this eliminates the need for fasteners to hold the steering motor cup 106 within the transmission housing 20 and provides for more precise position control of the steering motor 108, resulting in increased GPS anchor point precision. This also results in a quieter trolling motor assembly, as the steering motor cup 106 and steering motor 108 are held more snugly, without the use of fasteners, within the transmission housing 20. The relative tightness between the steering motor 108 and the gear train 109 also affects noise and backlash in the gear train 109, and thus holding the steering motor cup 106 rigidly within the transmission housing 20 is also helpful to reduce such noise and backlash.

The steering motor cup 106 can be connected to the transmission housing 20 via a pin 111 on the tab 110 that extends downwardly into the lower housing portion 24 or upwardly into the upper housing portion 22 of the transmission housing 20.

Although FIG. 11 shows the first embodiment of the assembly 10 provided in FIGS. 1-4, it should be noted that the steering motor cup and tab configuration may be used in any of the other embodiments of the trolling motor assembly described herein above.

Figure 12:
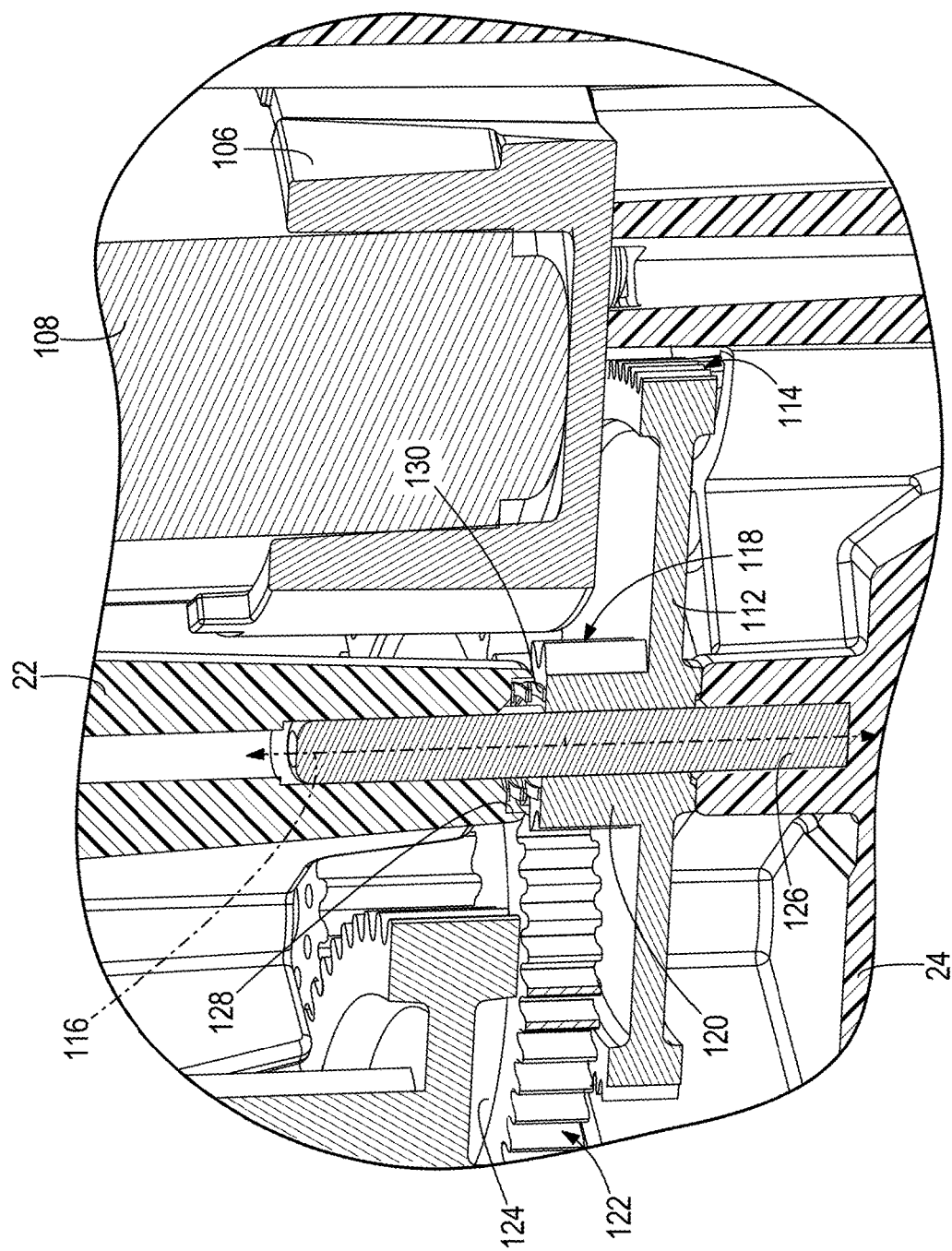
FIG. 12 illustrates a portion of a gear train within a transmission housing of a trolling motor assembly.
Figure 13:
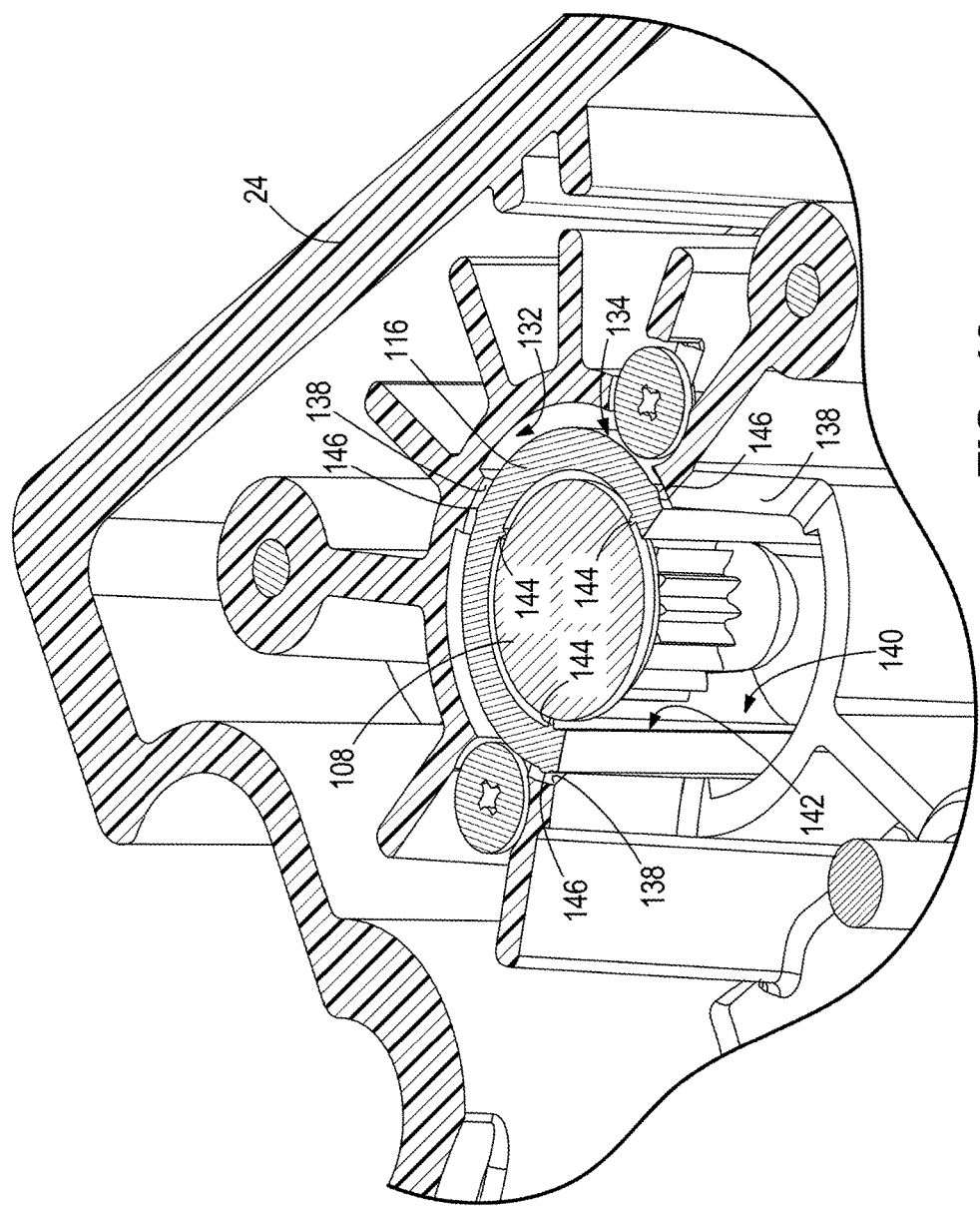
FIG. 13 illustrates another embodiment of a steering motor cup.

FIGS. 12 and 13 show further details of the interior of the transmission housing 20 that can be included in any of the above embodiments. As shown in FIG. 12, the gear train 109 includes a first gear 112 that is coupled to the steering motor 108 by a first set of teeth 114 surrounding its outer perimeter and is rotated about a first axis 116 by virtue of that connection. Closer to the first axis 116, the first gear 112 has a second set of teeth 118 around a perimeter of a raised center area 120. The second set of teeth 118 is meshed with the teeth 122 of a second gear 124, which rotates about a second axis. The first gear 112 rotates on a shaft 126 defining the first axis 116, which shaft 126 extends into the lower housing portion 24. An upper end of the shaft 126 extends into the upper housing portion 22. A pocket 128 is formed in the lower surface of the upper housing portion 22. The pocket 128 surrounds the shaft 126 and holds a resilient element 130 therein. In this example, the resilient element 130 is a spring that is compressed between the top surface of the raised center area 120 of the first gear 112 and the bottom surface of the pocket 128. In one example, the spring is a wave spring, the inner diameter of which surrounds the shaft 126. In other examples, the resilient element 130 can be a Belleville washer, a rubber or foam disc, or an air-filled bladder. Note that the resilient element 130 could instead be provided in a pocket in the lower housing portion 24. The resilient element 130 applies a force to damp sinusoidal movement of the first gear 112 that occurs naturally about its rotation axis 116 and thereby keeps the first gear 112 oriented in plane with the second gear 124. Maintaining the first and second gears 112, 124 in parallel reduces noise produced by the parts. The resilient element 130 thus limits non-rotational movement of gears in the gear train 109 and maintains the gears in a correct orientation with respect to one another. Although resilient elements could be provided for other gears in the gear train 109, having a spring to damp sinusoidal motion at the location shown is beneficial due to the fine teeth on the first gear 112 and the high rotation rate of the first gear 112 due to its direct connection to the steering motor 108.

Turning to FIG. 13, a detailed view of the steering motor cup 106 is shown therein. The steering motor cup 106 and steering motor 108 are shown in cross-section, so that details of the inner and outer circumferences of the steering motor cup 106 can be seen. The steering motor cup 106 is a hollow cylinder and sits within a cylindrical cavity in the lower housing portion 24. The inner surface 132 of the cylindrical cavity may contact the outer circumference 134 of the steering motor cup 106 around nearly the entire circumference, or the inner surface 132 of the cavity may have radially inwardly projecting ribs 138 that contact the outer surface of the steering motor cup 106. The steering motor 108 sits within the inner hollow 140 of the steering motor cup 106, and its diameter is just small enough that it nearly touches the inner circumference 142 of the steering motor cup 106. In order to provide a tight fit between the steering motor 108, the steering motor cup 106, and/or the cavity in the lower housing portion 24, crush ribs 144, 146 are provided on at least one of the inner circumference 142 and the outer circumference 134 of the steering motor cup 106. The crush ribs 144, 146 deform as the steering motor 108 is installed in the steering motor cup 106 or as the steering motor cup 106 is installed in the transmission housing 20, respectively. The steering motor cup 106 can be made by way of injection molding such that the crush ribs 144, 146 are integral with the outer and/or inner circumferences thereof. The crush ribs 144, 146 are thin enough that they deform or peel away as the parts are installed. For example, crush ribs 146 on the outer circumference 134 of the steering motor cup 106 deform or peel away as the steering motor cup 106 is inserted in the cavity and as the crush ribs 146 contact the ribs 138 of the cavity. Crush ribs 144 on the inner circumference 142 of the steering motor cup 106 deform or peel away as the steering motor 108 is inserted therein. The deformation of the crush ribs 144, 146 centers the part that is being inserted into another part, which creates a tight fit and prevents future movement of the parts with respect to one another.

The present trolling motor assemblies 10, 10', 10" have low cost and low part count, while at the same time provide for ease of storage and deployment of a trolling motor. The locking mechanisms, locking rods, hooks, pins, slots, etc. described hereinabove work together to keep the trolling motor assembly 10, 10', 10" firmly stowed when not in use, and to keep the trolling motor assembly locked in the deployed position when it is in use. The features described hereinabove also hold the GPS unit in the head 27 of the trolling motor assembly 10, 10', 10" in place, so that GPS readings are more precise. Because the GPS unit is connected to the controller that controls orientation of the thrust motor 32, this allows for better performance when holding an anchor point or waypoint tracking.

In the above description, certain terms have been used for brevity, clarity, and understanding. No unnecessary limitations are to be inferred therefrom beyond the requirement of the prior art because such terms are used for descriptive purposes and are intended to be broadly construed. The different systems described herein may be used alone or in combination with other systems. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A trolling motor assembly for propelling a boat in a body of water, the assembly comprising:
    a base configured to be attached to the boat;
    a cradle attached to the base, the cradle having an upper end with an upwardly concave surface;
    a transmission housing coupled to the base by way of a pivot pin extending generally transverse to the base and defining a pivot axis about which the transmission housing is pivotable with respect to the base;
    a shaft supported by the transmission housing and moveable relative to the transmission housing in a direction which is generally parallel to a longitudinal central axis of the shaft and rotatable with respect to the transmission housing about the shaft central axis; and
    a thrust motor attached to a lower end of the shaft and moveable and rotatable with the shaft;
    wherein the assembly is movable from a deployed position, in which the shaft central axis is aligned generally vertically, the transmission housing is locked in an upright position with respect to the base, and the thrust motor is configured to be below water, to a stowed position, in which the shaft central axis is aligned generally horizontally, the transmission housing is pivoted onto a first side thereof within the base, and the thrust motor rests in the upwardly concave surface of the cradle; and
    wherein the cradle is rotatable with respect to the base about a cradle pivot axis that extends generally transverse to the base.

2. The assembly of claim 1, further comprising a locking pin coupled to the base, wherein the locking pin both locks the transmission housing in the upright position when the assembly is in the deployed position and locks the cradle in an upright position when the assembly is in the stowed position.

3. The assembly of claim 2, further comprising a release mechanism coupled to the locking pin;
    wherein the locking pin travels in a first direction and a second direction in a horizontal slot in the base;
    wherein movement of the release mechanism in the first direction moves the locking pin in the first direction in the horizontal slot and out of engagement with a locking slot in one of the cradle and the transmission housing, thereby enabling movement of the assembly between the stowed and deployed positions; and
    wherein movement of the release mechanism in the second direction moves the locking pin in the second direction in the horizontal slot and into engagement with the locking slot in the one of the cradle and the transmission housing, thereby locking the one of the cradle and the transmission housing in its respective upright position.

4. The assembly of claim 3, further comprising a latching rod that serves as both the release mechanism and the locking pin.

5. The assembly of claim 4, further comprising a hook on the first side of the transmission housing, wherein the latching rod engages the hook and holds the transmission housing on the first side while the assembly is in the stowed position.

6. The assembly of claim 1, further comprising a spring in contact with both the cradle and the base, wherein the spring biases the cradle around the cradle pivot axis with respect to the base such that the assembly is biased into the deployed position.

7. The assembly of claim 6, wherein the spring is a torsion spring wound around the cradle pivot axis and located between the base and the cradle.

8. The assembly of claim 1, further comprising a tab coupled to a lower end of the cradle, wherein the tab extends inwardly under a second side of the transmission housing when the transmission housing is locked in the upright position and prevents the cradle from rotating with respect to the base when the assembly is in the deployed position.

9. A trolling motor assembly for propelling a boat in a body of water, the assembly comprising:
 a base configured to be attached to the boat;
 a cradle attached to and stationary with respect to the base, the cradle having an upper end with an upwardly concave surface;
 a transmission housing coupled to the base by way of a pivot pin extending generally transverse to the base and defining a pivot axis about which the transmission housing is pivotable with respect to the base;
 a shaft supported by the transmission housing and moveable relative to the transmission housing in a direction which is generally parallel to a longitudinal central axis of the shaft and rotatable with respect to the transmission housing about the shaft central axis; and
 a thrust motor attached to a lower end of the shaft and moveable and rotatable with the shaft;
 wherein the assembly is movable from a deployed position, in which the shaft central axis is aligned generally vertically, the transmission housing is locked in an upright position with respect to the base, and the thrust motor is configured to be below water, to a stowed position, in which the shaft central axis is aligned generally horizontally, the transmission housing is pivoted onto a first side thereof within the base, and the thrust motor rests in the upwardly concave surface of the cradle; and
 further comprising a first hook on the first side of the transmission housing, a second hook on a second side of the transmission housing, and a latching rod coupled to the base and moveable in a first direction and a second direction;
 wherein the latching rod engages with the first hook to hold the transmission housing on its first side while the assembly is in the stowed position; and
 wherein the latching rod engages with the second hook to hold the transmission housing on its second side and to lock the transmission housing in its upright position while the assembly is in the deployed position.

10. The assembly of claim 9, further comprising a vertical slot in the base through which the transmission housing pivot pin extends, wherein movement of the transmission housing pivot pin in an upward direction in the vertical slot enables the thrust motor to clear the stationary cradle while the assembly is moving between the stowed and deployed positions.

11. The assembly of claim 10, wherein movement of the transmission housing pivot pin in a downward direction in the vertical slot enables the latching rod to engage with the first hook.

12. The assembly of claim 10, further comprising a locking surface extending across a lower edge of the transmission housing proximate the first side and located adjacent and parallel to the transmission housing pivot pin, wherein the locking surface has a radius that is off center with respect to the transmission housing pivot axis.

13. The assembly of claim 12, further comprising a fulcrum extending across the transmission housing parallel to and offset in the second direction from the locking surface and the transmission housing pivot axis, wherein pivoting of the transmission housing about the transmission housing pivot axis and about the fulcrum as the assembly moves into the deployed position causes the transmission housing to translate such that the transmission housing pivot pin slides upward within the vertical slot.

14. The assembly of claim 9, wherein the stationary cradle comprises a convexly rounded surface including a living hinge that connects to the upwardly concave surface and that enables the cradle to flex as the thrust motor moves over the cradle when the assembly moves between the stowed and deployed positions.

15. The assembly of claim 14, wherein the upwardly concave surface of the cradle includes concave locking surfaces that move with the living hinge and that hold the thrust motor in place when the assembly is in the stowed position.

16. The assembly of claim 1, wherein the cradle comprises two laterally spaced arms configured to hold the transmission housing therebetween when the assembly is in the deployed position, and further comprising bosses formed on opposing inner faces of the cradle arms that contact the transmission housing and hold the transmission housing firmly in place when the assembly is in the deployed position.

17. The assembly of claim 16, wherein the bosses contact an outer surface of the transmission housing where the outer surface of the transmission housing is radially closest to the shaft.

18. A trolling motor assembly for propelling a boat in a body of water, the assembly comprising:
 a base configured to be attached to the boat;
 a cradle attached to the base, the cradle having an upper end with an upwardly concave surface;
 a transmission housing coupled to the base by way of a pivot pin extending generally transverse to the base and defining a pivot axis about which the transmission housing is pivotable with respect to the base;
 a shaft supported by the transmission housing and moveable relative to the transmission housing in a direction which is generally parallel to a longitudinal central axis of the shaft and rotatable with respect to the transmission housing about the shaft central axis; and
 a thrust motor attached to a lower end of the shaft and moveable and rotatable with the shaft;
 wherein the assembly is movable from a deployed position, in which the shaft central axis is aligned generally vertically, the transmission housing is locked in an upright position with respect to the base, and the thrust motor is configured to be below water, to a stowed position, in which the shaft central axis is aligned generally horizontally, the transmission housing is pivoted onto a first side thereof within the base, and the thrust motor rests in the upwardly concave surface of the cradle; and further comprising a steering motor cup within the transmission housing, the steering motor cup having a tab extending outwardly therefrom that interfaces with the transmission housing.

19. The assembly of claim 18, wherein the tab is sandwiched between an upper housing portion of the transmission housing and a lower housing portion of the transmission housing.

20. The assembly of claim 18, further comprising:
a steering motor situated within the steering motor cup; and
crush ribs on at least one of an inner circumference and an outer circumference of the steering motor cup which deform as the steering motor is installed in the steering motor cup or as the steering motor cup is installed in the transmission housing, respectively.

21. The assembly of claim 18, further comprising:
a steering motor situated within the steering motor cup;
a gear train transmitting rotation of the steering motor to rotation of the shaft; and
a resilient element that limits non-rotational movement of gears in the gear train and that maintains the gears in a correct orientation with respect to one another.

22. The assembly of claim 18, wherein the cradle is rotatable with respect to the base about a cradle pivot axis that extends generally transverse to the base.

23. The assembly of claim 22, further comprising a locking pin coupled to the base, wherein the locking pin both locks the transmission housing in the upright position when the assembly is in the deployed position and locks the cradle in an upright position when the assembly is in the stowed position.

24. The assembly of claim 23, further comprising a release mechanism coupled to the locking pin;
wherein the locking pin travels in a first direction and a second direction in a horizontal slot in the base;
wherein movement of the release mechanism in the first direction moves the locking pin in the first direction in the horizontal slot and out of engagement with a locking slot in one of the cradle and the transmission housing, thereby enabling movement of the assembly between the stowed and deployed positions; and
wherein movement of the release mechanism in the second direction moves the locking pin in the second direction in the horizontal slot and into engagement with the locking slot in the one of the cradle and the transmission housing, thereby locking the one of the cradle and the transmission housing in its respective upright position.

\* \* \* \* \*